United States Patent
Head

[19]

[11] Patent Number: 5,996,689
[45] Date of Patent: Dec. 7, 1999

[54] CONDUIT AND CONTINUOUS COILED TUBING SYSTEM

[76] Inventor: Philip Head, 178 Brent Crescent, Park Royal, London, NW10 7XR, United Kingdom

[21] Appl. No.: 08/948,702

[22] Filed: Oct. 10, 1997

[30] Foreign Application Priority Data

Oct. 11, 1996 [GB] United Kingdom .................. 9621235

[51] Int. Cl.$^6$ .................................................. E21B 17/20
[52] U.S. Cl. ...................................... 166/77.2; 174/101.5
[58] Field of Search ............................... 166/75.11, 77.2, 166/242.2; 179/101.5

[56] References Cited

U.S. PATENT DOCUMENTS

| | | | |
|---|---|---|---|
| 4,346,256 | 8/1982 | Hubbard et al. ...................... | 166/242.2 |
| 4,963,420 | 10/1990 | Jarrin et al. ........................... | 174/101.5 |
| 5,110,644 | 5/1992 | Sparks et al. ......................... | 166/242.2 |
| 5,236,036 | 8/1993 | Ungemach et al. ................... | 166/77.2 |
| 5,521,885 | 5/1996 | Harvey .................................. | 174/101.5 |

FOREIGN PATENT DOCUMENTS 2 265 684   10/1993   United Kingdom .

*Primary Examiner*—William Neuder
*Attorney, Agent, or Firm*—Herbert Dubno

[57] ABSTRACT

A coil tube and conduit system for feeding into a well has the coiled tube form an annular space closed at its top and herein a relatively dense liquid while the conduit is provided with buoyancy means so that within that coiled tube the conduit can be buoyed up by the confining liquid and hence the weight of the conduit relieved.

20 Claims, 7 Drawing Sheets

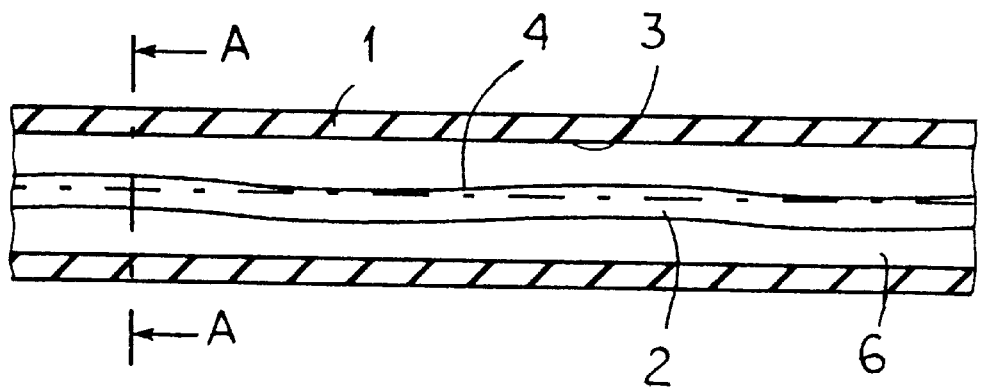
FIG.4
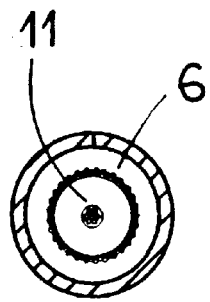 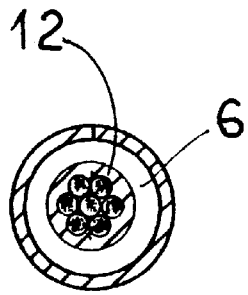 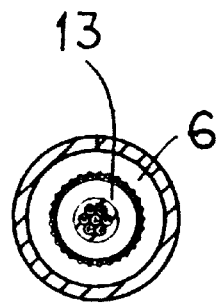 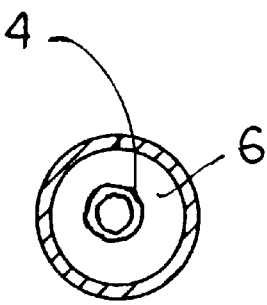
FIG.5   FIG.6   FIG.7   FIG.8

CONDUIT AND CONTINUOUS COILED TUBING SYSTEM

FIELD OF THE INVENTION

This invention relates to a conduit and continuos coiled tubing system for operating and deploying a powered device in a well.

BACKGROUND OF THE INVENTION

Coiled or continuous reel tubing has been used in the oil industry for the last 20–30 years. The fact that a continuous single tube is used provides several advantages when entering a live oil or gas well which could have anything up to 7,000 psi well head pressure. This means the well does not have to be killed, (i.e. a heavy fluid does not have to be pumped down the production tubing to control the oil or gas producing zone by the effect of its greater hydrostatic pressure). Continuous tubing has the advantage of also being able to pass through the tubing through which the oil and/or gas is being produced, not disturbing the tubing in place.

Since its introduction, the uses and applications for coiled tubing have grown immensely, and now, rather than just being used to circulate various fluids in a well bore, it is not uncommon for coiled tubing to be used for conveying various hydraulically powered tools and more recently electrically powered tools on its end into the well. This has resulted in conventional electrical wire-line logging cables or small hydraulic conduits being inserted into the inside of the reel of tubing so that these more sophisticated tools can be used and services can be performed.

A disadvantage which has resulted from this practice is the capstan effect of the smaller diameter wire-line or hydraulic tube tending to be pulled very tightly to the inner surface of the continuous reel of tubing. When considering the effect this has on the geometry, it will be appreciated that the wire-line or small hydraulic conductor will have a slightly smaller pitch circle diameter to that of the larger reeled tubing. The consequence of this is that for each complete 360 degrees of a turn the wire-line or hydraulic tube will be slightly shorter in length than the larger reeled tubing, so if this is added up over its total length of 12,000 ft (3657 m) or usually longer the difference in lengths could be as much as 200 ft (61 in).

This problem has been recognized due to the operational problems encountered. Either one end of the wire-line or hydraulic tube has been pulled out of its connection, or else the reeled tubing itself develops a low frequency wave form caused by the tension in the conduit inside the reeled tubing, which prevents the reeled tubing from being lowered any deeper into the well without the risk of damaging it.

Also the effect of increasing the weight of the conduit and for conduits having a certain length has resulted in the conduit being prone to stretching or creep when installed in the well in particular when it is considered that the conduit is intended to remain in position for a relatively long period of time for production of the well. The type of conduit for which stretching is a problem depends upon the weight per unit length of the conduit, the material of the conduit and the expected working life of the conduit. Stretching and slippage of the conduit is frequently a serious problem.

OBJECT OF THE INVENTION

It is an object of the present invention to provide a conduit, coiled tubing system which avoids this problem of stretching and overcomes the other disadvantages of present known systems mentioned above.

SUMMARY OF THE INVENTION

According to the invention there is provided a conduit and coiled tubing system for deployment in a well, in which the conduit is arranged internally of the coiled tubing which comprises a wall and an internal bore, and one end of the coiled tubing is attached to a powered device such as a motor or a drill which is to be installed in the well by a first attaching means arranged between the wall of the coiled tubing and the powered device, and wherein the conduit is connected at one end to a power supply at the surface and connected at the opposite end to the powered device and that fluid is provided in the annular space between the conduit and the internal wall of the tube and which provides an upwards buoyancy force to support at least in part the downward force due to the weight of the conduit.

Preferably the specific gravity of the fluid is greater than the average density of the conduit so that a buoyancy force is provided. The specific gravity of the fluid is preferably greater than 1 $g/cm^3$.

The fluid in the annular space may be a concentrated salt solution such as calcium chloride solution, or alternatively an oil or water based gel. Such heavy fluids provide a buoyancy force on the conduit which supports the weight of the conduit along the whole of its length and this prevent the stretching or breaking of the conduit.

The conduit alternatively may comprise at least one buoyancy means. The buoyancy means may be arranged in-between the conduit and the internal wall of the coiled tubing and attached to the coiled tubing or the conduit.

The at least one buoyancy means may be a single buoy extending along a substantial part of the length of the conduit or alternatively arranged co-axially around the conduit.

Preferably the at least one buoyancy means is activatable between a "neutral" state in which the at least one buoyancy means does not act to support the weight of the conduit and an "active" state in which the at least one buoyancy means is buoyant and acts to support the weight of the conduit.

The at least one buoyancy means may be a plurality of buoys arranged in spaced relationship along the length of the conduit.

The at least one buoyancy means may be filled with a relatively lighter fluid such as air or another gas such as nitrogen and is preferably in the form of a flexible bladder which expands to fill at least a part of the concentric space between the conduit and the internal wall of the coiled tubing when said buoyancy means is filled with the relatively lighter fluid, or gas.

Alternatively the at least one buoyancy means is in the form of a rigid chamber or series of chambers and may also be in the form of a rigid cellular foam-like material.

The cellular foam-like material may fill the concentric space between the conduit and the internal wall of the coiled tubing and can provide an adhesive grip on the internal wall of the coiled tubing which aids the support of the conduit to the coiled tubing.

Alternatively the at least one buoyancy means is in the form of a longitudinal buoy arranged axially on the external wall of the conduit and having a width which corresponds in dimension to a section of the circumference of the conduit.

The at least one buoyancy means may be activated by the ingress of air into the at least one buoy.

The at least one buoyancy means engages the internal bore of the tube and prevents lateral movement of the conduit relative to the tube in the "active" state in one or both directions. The buoyancy means may be activated by means of a reagent.

The length of the conduit may exceed the length of the tube, the excess of conduit causing the conduit to form at least one curve or wave within the tube; the excess length of conduit may cause a curve to be formed in the conduit between each buoy.

The conduit may alternatively comprise a casing which comprises buoyancy means such a glass beads which provide the desired combination of low weight and sufficient strength to support long lengths of the cable. These beads may be included in the sheathing used to protect the transmission leads of the cable, being the electric wires, fibre optic lines, hydraulic lines. The glass beads will be such as to provide the desired pressure resistance as well as buoyancy and have a specific gravity of between 0.6 and 1.0 and a collapse pressure of between 2000 and 10000 psi and have a mesh size between 10 and 80 micrometers.

BRIEF DESCRIPTION OF THE DRAWINGS

The following is a more detailed description of some embodiments of the invention by way of example, reference being made to the accompanying drawings, in which:

FIG. 4 shows a longitudinal cross section of the conduit and coiled tubing system of a further embodiment of the invention;

FIG. 5 shows a cross-section taken along the line A—A of FIG. 4, through a conduit having a coaxial cable set in the middle of the conduit;

FIG. 6 shows a cross-section taken along the line A—A of FIG. 4, through a conduit having a multi-conductor set in the middle of the conduit;

FIG. 7 shows a similar view to FIG. 5, in which the conduit is a fiber optic cable;

FIG. 8 shows a similar view to FIG. 5, in which the conduit is a steel tube for transmitting hydraulic pressure, or for acoustic transmissions;

DESCRIPTION OF THE PREFERRED EMBODIMENTS

Figure 1:
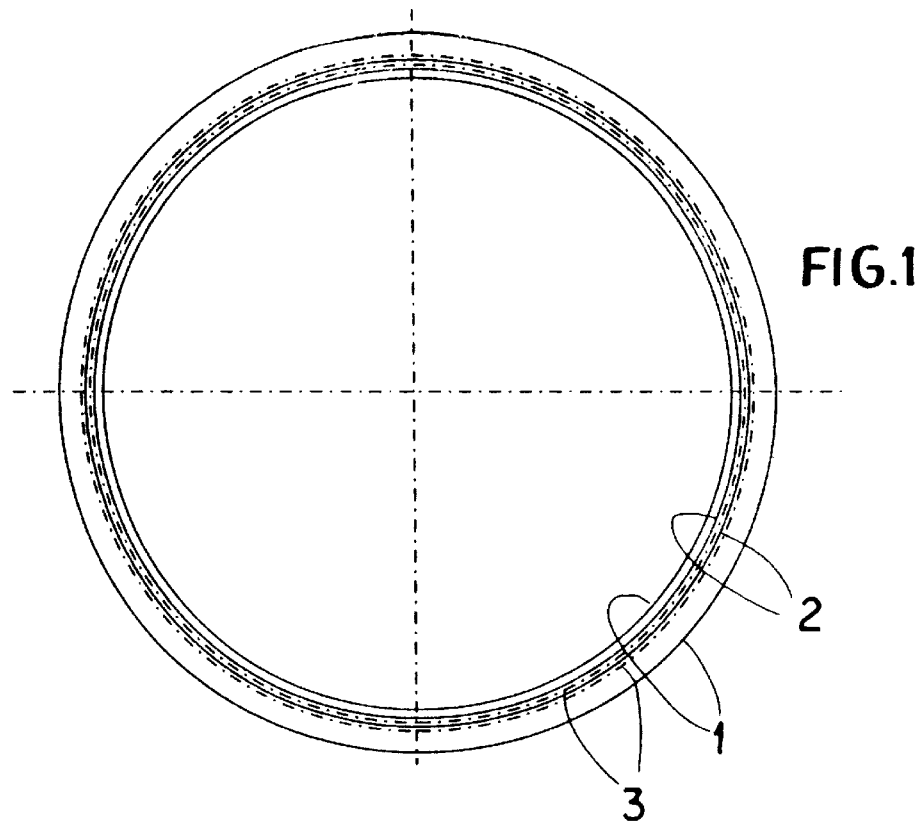
FIG. 1 shows a side view of a coiled tubing reel showing a conduit lying inside the coiled tubing on its inner surface.

Referring first to FIG. 1, there is shown a side cross-sectional view of one wrap or turn of coiled tubing 1, with a conduit 2, lying on the inside wall 3 of the coiled tubing. A first dot-dash line shows the diameter center line of the coiled tubing 1 while a second dot-dash line shows the diameter center line of the conduit 2. It will be appreciated that because they have different center line diameters, their lengths per wrap will be slightly different with the coiled tubing being slightly longer. Multiplying this difference in length by the total number of wraps enables the difference in overall length to be determined, which can be in excess of 100 ft (30 in). The conduit is therefore preferably arranged so as to have a wavy profile to accommodate this.

Figure 1A:
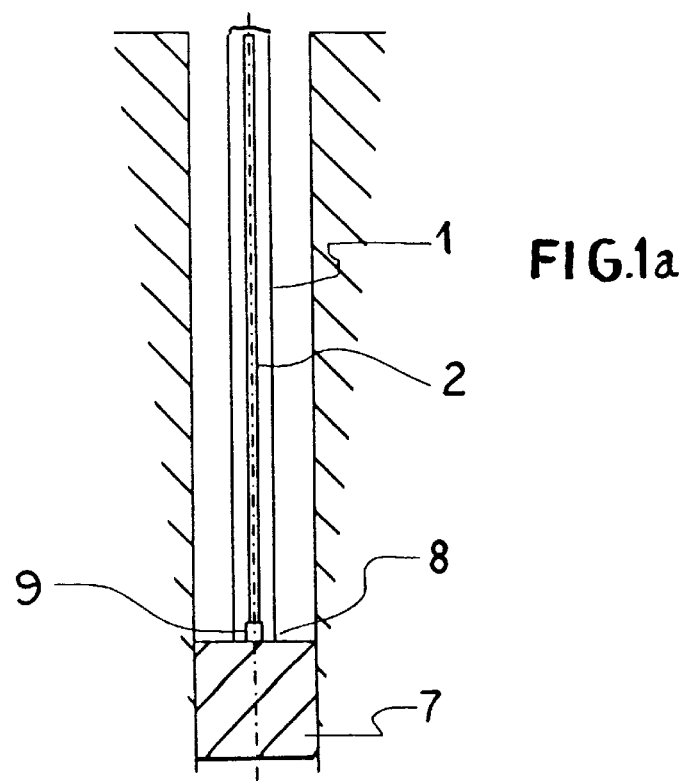
FIG. 1a is a longitudinal section which shows the conduit and coiled tubing system installed in a well.
Figure 1B:
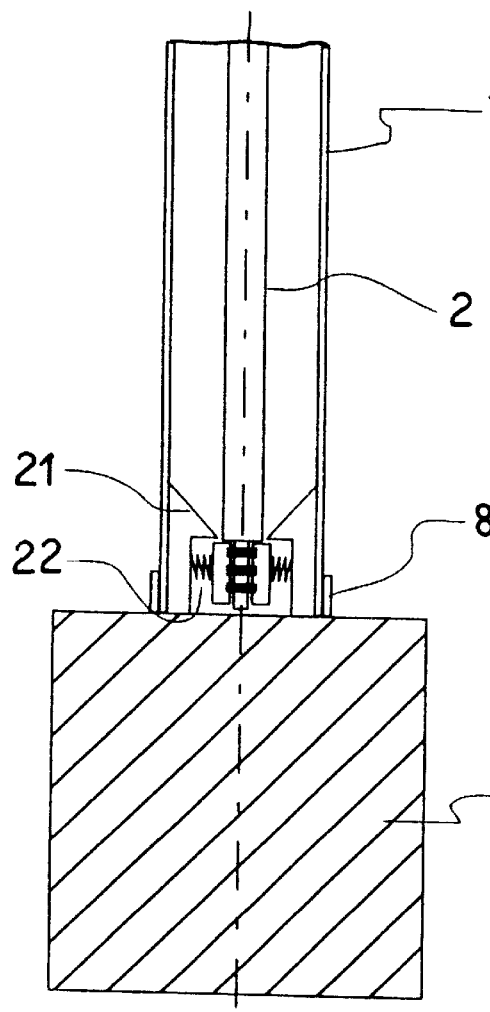
FIG. 1b is a section which shows the attaching and connecting with a powered device.

Referring to FIGS. 1a and 1b the assembly of the conduit 2 and the coiled tubing 1 can be connected to a powered a device 7 which is deployed in a well. The conduit is arranged internally of the coiled tubing which comprises a wall and an internal bore, and one end of the coiled tubing 1 is attached to the powered device by a first attaching means 8 arranged between the wall of the coiled tubing 1 and the powered device 7. The powered device 7 may be a pump or a drill or other down-hole powered machine.

Figure 8A:
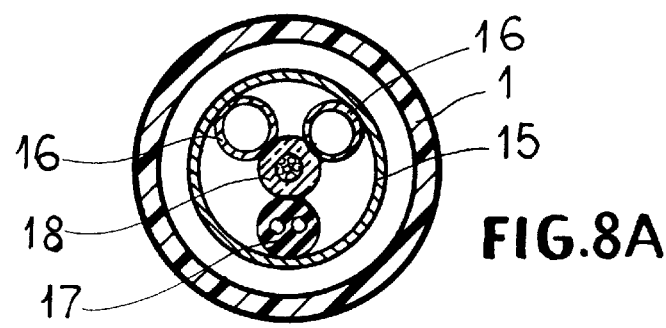
FIG. 8A shows a similar view of FIG. 5 in which the conduit is a multi-use member.

In FIGS. 4 to 8 several examples of the conduit function are shown; viz., an electrical signal via a coaxial cable 11, an electrical signal/electrical power via a multi-conductor cable 12, a fiber optics data transmission 13, a hydraulic conduit 14 or a combination of any of the above in a multi-conductor conduit 15 (FIG. 8A). In this last example two multi-conductor conduit comprises two hydraulic lines 16, an electrical line 17 and a fibre optic line 18. The signal line inside the conduit could also have a wavy profile, which could be important if the signal line is fiber optic.

The conduit 2 is connected at one end (the upper end in the installed position shown in FIG. 1a) to a power supply at the surface and connected at the opposite end to the powered device 7 by a first connection means 9 which is located within the wall of the coiled tubing 1 and within the first attaching means 8 so that the conduit 2 is prevented from contact with the outside of the coiled tubing 1 at all times.

The conduit may be pre-installed inside the coiled tubing and attached to the powered tool at the surface and the system lowered down the well together to the desired location. Alternatively the conduit and the powered device 7 may be lowered to the desired location first and then subsequently the conduit 2 is lowered and connected to the powered device 7 by means of a remote auto-locking mechanism 20 as shown in FIG. 1b. The conduit is effectively "stabbed" into the auto-locking mechanism 20 by permitting the conduit to drop into it and the auto-locking mechanism which permits the end of the conduit to engage it and then locks it in position. The auto-locking mechanism 20 may comprise a spring biased over center arrangement 22 which locks the end of the conduit after it is pushed in to it to a certain pre-defined extent. The connection means 9 of the powered device 7 preferably includes guides 21 to ensure that the end of the conduit is guided into the auto-locking mechanism.

The auto-locking mechanism will preferably included a dual auto-locking means so that both the transmission line of the conduit, for example the electric cable, can be connected automatically to provide the required electrical contact and also and separately the sheathing of the conduit is locked automatically to a corresponding mechanical gripping means.

Referring to FIGS. 4 to 8 a fluid is provided in the annular space 6 between the conduit and the internal wall 3 of the tube. In this embodiment the fluid is a concentrated solution of calcium chloride which is made using 22 lbs of calcium chloride (94%–97%) pure, mixed together with 34 gallons of water which makes one US barrel of the required calcium chloride solution. The solution has a specific gravity of 1.439. The fluid is preferably pumped in after the conduit has been installed in the tube and one end sealed but the fluid may be pumped simultaneously with the conduit and the ends sealed when installation is complete.

It will be appreciated that alternative fluids may be used which have a sufficiently high density to provide the desired buoyancy force on the conduit. Water based gels may be used in which the base fluid is water and the gelling agent is a water soluble polymer such as guar gum. This can produce a significantly viscous gel which can be used to support weighting agents such as barite or hermatite or sand, so the final specific gravity of the gel can be made as high as 2.0 specific gravity. Polymeric cross liking agent scan be used to make the gel last for a sufficiently long time to last for the life of the tube and conduit system.

Also oil-based gels may be used, formed by adding gelling agents to oil based fluids such as aluminium salts of organic acids to raise the viscosity of hydrocarbon fluids. Again similar weighting agents can be used to get the specific gravity as high as 2.0. Cross linking agents can be used in these gels also to improve the durability.

An example of a suitably dense fluid is Fluorinert (a trade mark of the 3M company), which has a specific gravity of 2.0 and which is a dieletrically stable at high operating temperatures.

In FIGS. 2, 3 and 9 to 16 various embodiments of the conduit and coiled tubing system of the invention are shown in which the conduit 2 is installed internally of the coiled tubing 1 which comprises an internal bore, wherein the conduit and coiled tubing system comprises at least one buoyancy means 5 arranged in-between the conduit and the internal wall of the coiled tubing. The at least one buoyancy means 5 is attached securely to the conduit 2. This may be by means of a suitable adhesive or by grip means arranged concentrically around the conduit, not shown.

Figure 15:
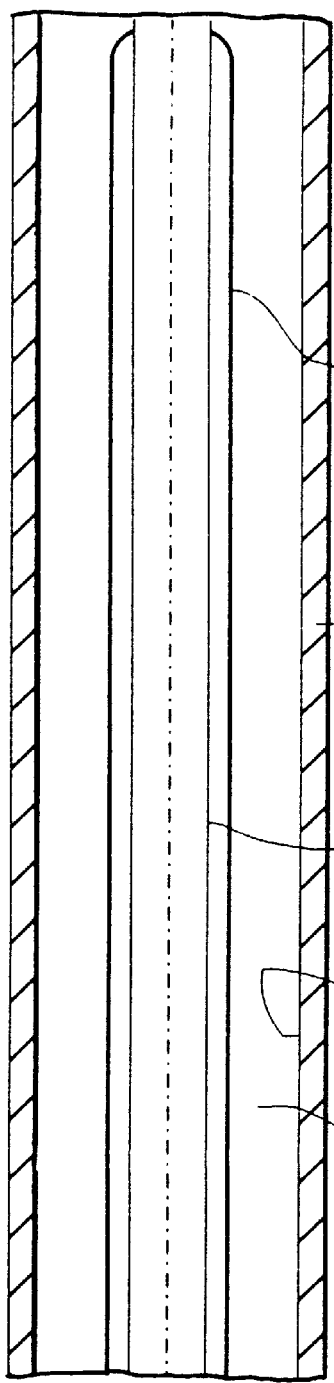
FIG. 15 shows a longitudinal cross-sectional view of a further embodiment of the system of the invention.
Figure 16:
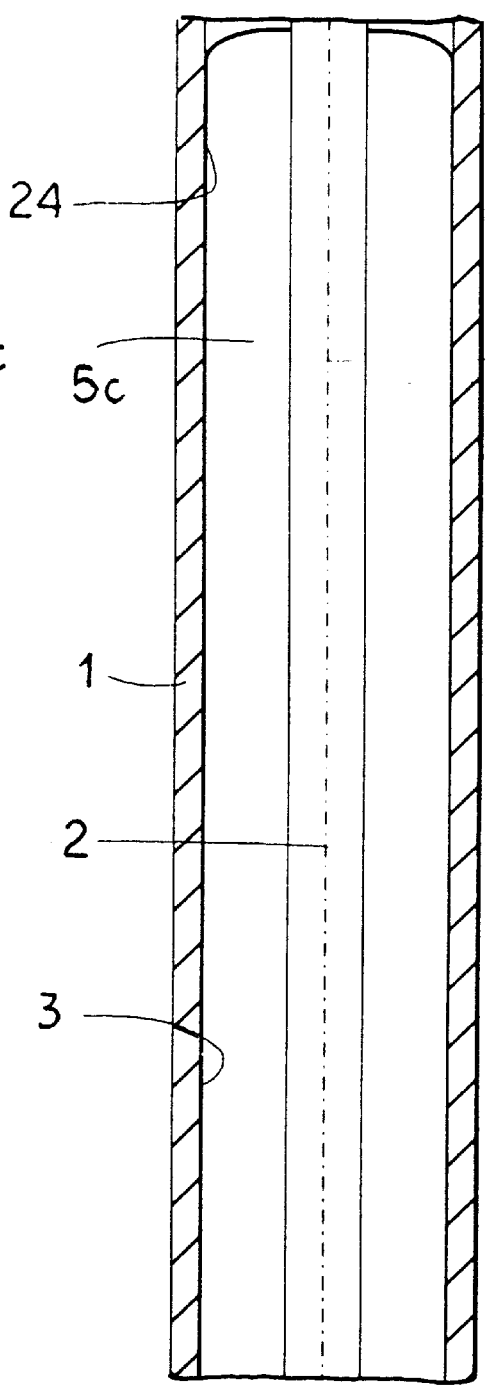
FIG. 16 shows a longitudinal cross-section of the embodiment in FIG. 15 in the active state.

In one embodiment of the conduit and coiled tubing system shown in FIGS. 15 and 16 the at least one buoyancy means 5c is a single buoy extending along a substantial part of the length of the conduit. In the embodiment shown in FIGS. 11 and 12 the at least one buoyancy 5a means is arranged co-axially around the conduit.

Figure 9:
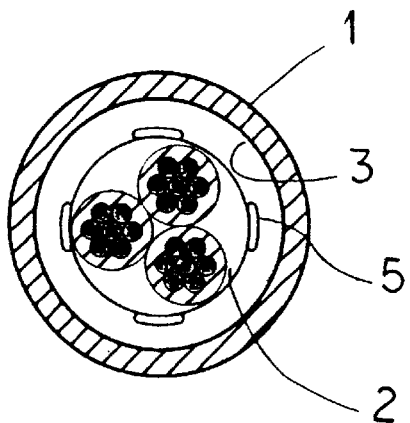
FIG. 9 shows a cross section of a further embodiment of the system of the invention.
Figure 10:
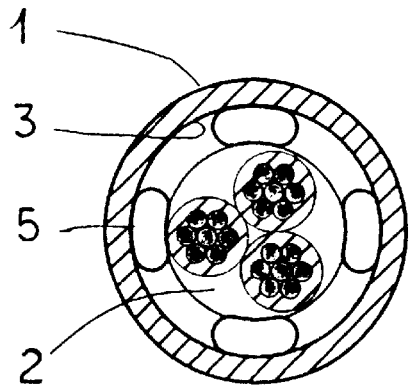
FIG. 10 shows the embodiment of FIG. 9 in the active state.
Figure 11:
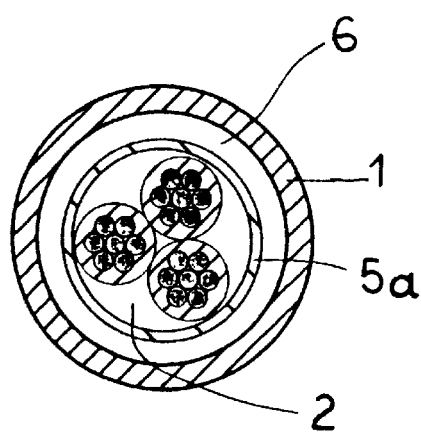
FIG. 11 shows a cross section of a further embodiment of the system of the invention.
Figure 12:
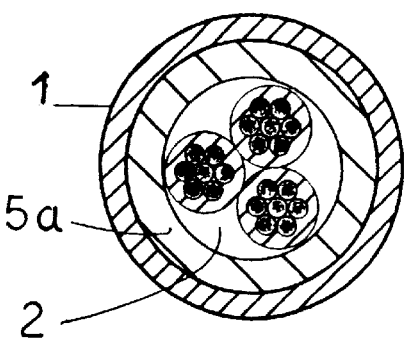
FIG. 12 shows, in transverse section, the embodiment of FIG. 11 in the active state.
Figure 13:
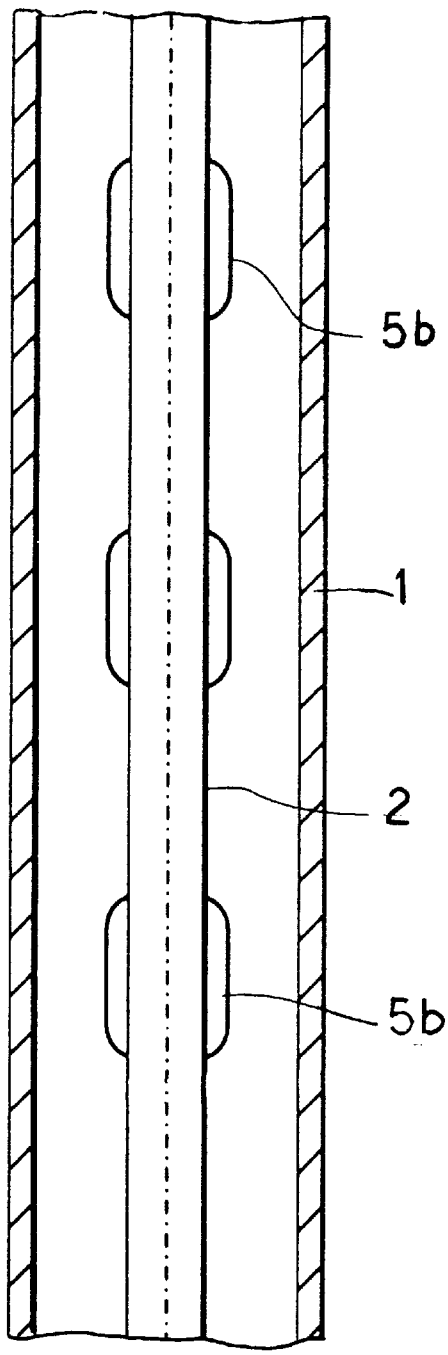
FIG. 13 shows a longitudinal cross section of a further embodiment of the system of the invention.
Figure 14:
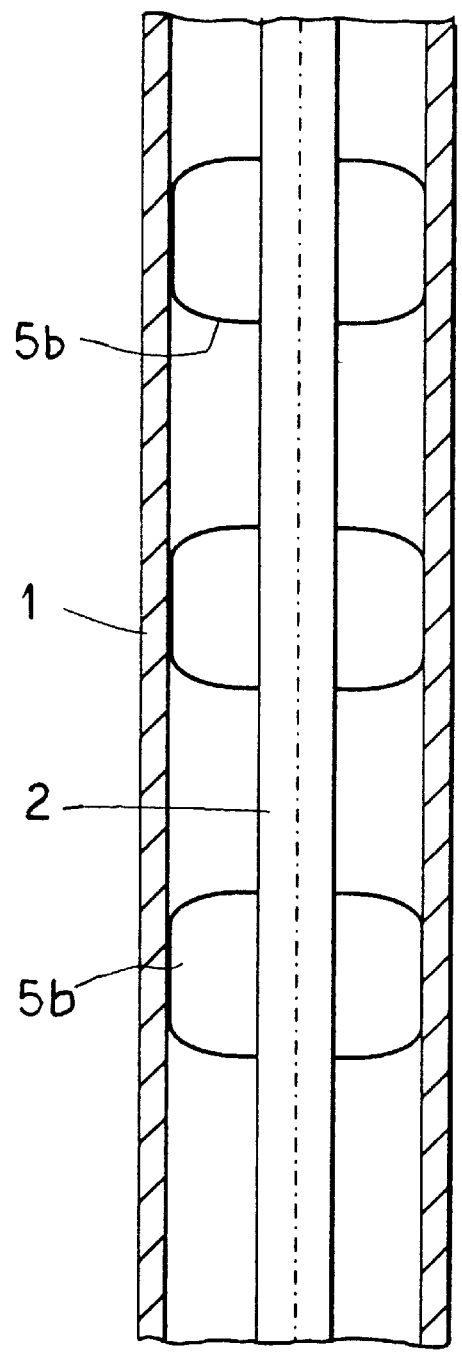
FIG. 14 shows in longitudinal section the embodiment of FIG. 13, in the active state.

The at least one buoyancy means 5, 5a, 5b, 5c is activatable between a "neutral" state in which the at least one buoyancy means 5, 5a, 5b, 5c does not act to support the weight of the conduit which is shown in FIGS. 9, 11 and 13 and an "active" state in which the at least one buoyancy means 5, 5a, 5b, 5c is buoyant and acts to support the weight of the conduit 2, as shown in FIGS. 10, 12, and 14.

In a further embodiment of the conduit and coiled tubing system according to the invention the at least one buoyancy means 5b is a plurality of buoys arranged in spaced relationship along the length of the conduit. The buoys 5b are spaced corresponding to the waves formed in the conduit to give it a slightly greater length than the coiled tubing.

The activation of the buoyancy means 5, 5a, 5b, 5c takes place either immediately after installation of the conduit within the coiled tubing or alternatively when the conduit and coiled tubing system is first deployed in a well so that it is essential vertical and the weight of the conduit is required to be supported to prevent stretching or breakage. In order to activate the system the buoyancy means 5, 5a, 5b, 5c are filled with a relatively light fluid such as air or another gas such as nitrogen.

The buoyancy means 5, 5a, 5b, 5c is in the form of a flexible bladder which expands to fill at least a part of the concentric space 6 between the conduit 2 and the internal wall 3 of the coiled tubing when said buoyancy means is filled with the relatively lighter liquid, or gas. Preferably the buoyancy means is activated by the ingress of air into the at least one buoy.

The buoyancy means 5, 5a, 5b, 5c expands to fill annular space 6 and this volume of the gas provides buoyancy to the conduit to support its weight. The buoyancy means 5, 5a, 5b, 5c will also engage the internal wall of the coiled tubing 2 which will also resists the downward forces acting on the conduit and serve to reduce the effect of the downward weight of the conduit. It will be appreciated that although the buoyancy means 5, 5a, 5b, 5c are referred to as such it is not essential that they provide sufficient buoyancy to effectively float the conduit in the coiled tubing. They may merely assist in supporting some of the weight of the conduit 2. The object of the invention is to reduce the effect of stretching and this can be achieved by just reducing the downward force on the conduit by a certain critical amount. This extent of the required buoyancy effect of the buoyancy means will therefore depend upon a number of other factors relating to the type and function of the conduit itself. The conduit may just need a little support to reduce the effect of its weight slightly, or alternatively the conduit may need to be supported to the extent of all or nearly all of its weight. Or the extent of the support required may be anywhere in between these two extremes.

Rather than being entirely concentric the buoyancy means 5 in FIGS. 9 and 10 is in the form of a longitudinal buoy arranged axially on the external wall of the conduit and having a width which corresponds in dimension to a section of the circumference of the conduit.

Figure 2:
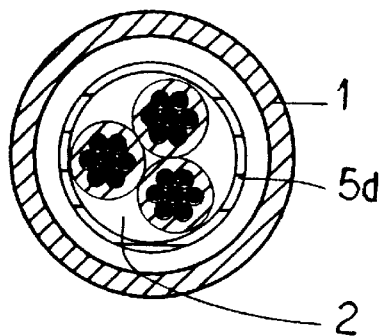
FIG. 2 shows a cross section of a first embodiment of the conduit and coiled tubing system of the invention.
Figure 3:
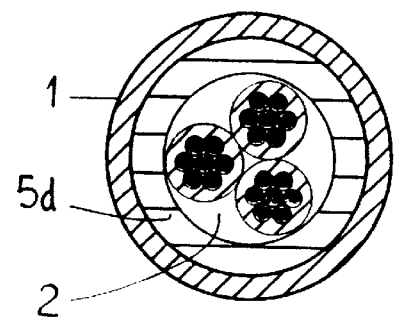
FIG. 3 shows a cross section of the system of FIG. 2 in the active state.

With reference to FIG. 2 and 3, there is shown a buoyancy means 5d which is firmly attached to the conduit 2 inside the coiled tubing 1. The buoyancy means 5c has a plurality of interconnected chambers or cells which are affixed to and contact the outer surface of the conduit, buoying the conduit 2 reduce the down ward force of its weight in use. The buoy 5d may also be connected to the inside surface 3 of the coiled tubing. This makes use of the coiled tubing 1 to carry the weight of the conduit 2 until the next buoying apparatus 20, some distance further along the coiled tubing in the case that the buoyancy means is separate buoys. It will be appreciated that because the conduit 2 does not have to support its entire length when hung vertically in an oil well, its dimensions and weight may be significantly reduced. It will also be appreciated that because the conduit 2 is buoyed to the coiled tubing 1, no movement of the conduit is possible and the conduit remains in the same position regardless of pump rate and gravity effect. This also prevents any "bird nesting" or bunching at the extreme end of the coiled tube string which is common with existing wire-line installation and which causes cables to be pulled away from an electrical socket at the surface, which may cause the cable to crimp, resulting in a short circuit and disable the cable. In addition fibre optics may also be exploited, as the conduit is buoyed to the coiled tubing, and it has a built-in slack due to its wavy form, both in the fiber optic cable inside its conduit, and in addition to the conduit itself having a wavy form, so that the fiber optic cable is not subjected to any stretching whatsoever.

So that the conduit 2 may be installed inside the coiled tubing 1 the buoyancy means 5, 5a, 5b, 5c, 5d must be retained close to the conduit surface 4, which is achieved by the buoyancy means being in an un-inflated state and/or by using a wrapping material. This may be made from any material which can be removed once the conduit 2 has been installed inside the coiled tubing 1. The conduit 2 might be installed at the time of manufacture, or installed some time after manufacture. It will be appreciated that if it is installed some time after manufacture it will have to withstand the effects of friction, because the conduit 2 might have to be installed by pumping it through the coiled tubing 1 which could be many thousands of feet long. It is necessary that the buoyancy means is therefore in its neutral state so that the conduit 2 may be installed in the coiled tubing 1.

In FIGS. 2 and 3 the conduit and coiled tubing system according to the invention comprise a buoyancy means in the form of a cellular foam-like material which provides an adhesive grip on the internal wall of the coiled tubing which aids the support of the conduit to the coiled tubing. The foam like material is of the expandable form which can be provided on the external 4 surface of the conduit 2 or alternatively on the internal wall of the coiled tubing, in the un-expanded state before installation of the conduit inside the coiled tubing. After installation the foam-like expandable material is activated to expand and fill the concentric space 6 between the conduit 2 and the coiled tubing 1. The foam-like expandable material may be any suitable material which can be activated to expand. Such materials are likely to be polymeric and activated by the application or a reagent which causes the expansion process and the reagent is pumped through the coiled tubing after the conduit has been installed. Alternatively the expandable material may be activated by temperature or by time in contact with air.

Figure 17:
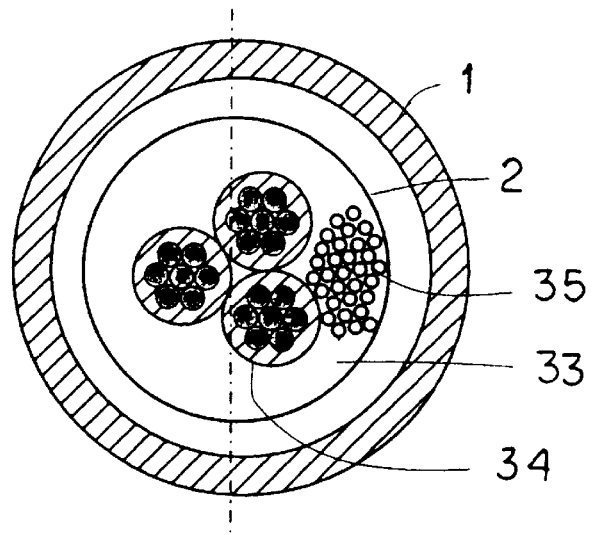
FIG. 17 is a cross section of a further embodiment of the buoyancy means.
Figure 18:
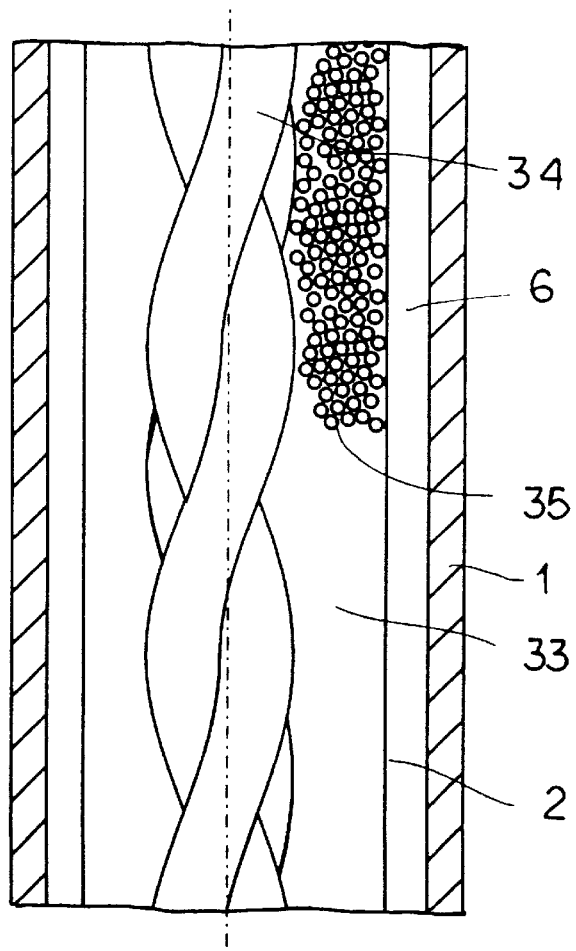
FIG. 18 is a longitudinal section of the embodiment of FIG. 17.

Referring now to the embodiment of FIGS. 17 and 18, the conduit 32 alternatively comprises a casing or sheathing 33 which comprises buoyancy means such a glass beads 35 which provide the desired combination of low weight and sufficient strength to support long lengths of the cable 32. These beads 35 may be included in the sheathing 33 used to protect the transmission leads 34 of the cable, being the electric wires, fibre optic lines, hydraulic lines. The glass beads 35 are uniformly arranged in the sheathing of the conduit and this is advantageously achieved by including the glass beads granular plastic feed before the extrusion process of the sheathing.

Such glass beads 35 are hollow spheroids with air inside which provides the low specific gravity and hence buoyancy effect as well as high strength. They are typically made by allowing small droplets of molten glass to fall from a height in a tower though air. The droplets cool as they fall and also form the required hollow spheroids.

The type of glass beads 35 can be chosen such as to provide the desired pressure resistance as well as buoyancy. Preferably the beads will have a specific gravity of between 0.6 and 1.0. It has been found that the ideal specific gravity is 0.7. The collapse pressure of the beads 35 is also an important property because at lower depths the sheathing may be subject to high pressures and this is therefore required to be between 2000 and 10000 psi. It has been found that the ideal collapse pressure of 6000 psi is sufficient for most applications. The size of the glass beads is also a factor which is also interdependent with the specific gravity and pressure difference but also has an effect on the strength properties of the sheathing which is an important consideration in the support of the weight of the conduit. The beads 35 may have a mesh size between 10 and 80 micrometers. It has been found however that the ideal mesh size is between 20 and 40 micrometers. It will be appreciated that the beads 35 need not be glass beads but may be made of any material provided these important properties are met.

Thus by means of these buoyancy means associated with the conduit buoyancy may be provided when a conventional fluid is used in the annular space 6 such as water or a dielectric oil having a specific gravity of 1 or less.

Alternatively the buoyancy means associated with the conduit could be used in combination with a heavy fluid in the annular space 6 so that a maximum buoyancy effect may be achieved.

Whatever the embodiment of the chosen buoyancy means of the invention the buoyancy means may engage the internal bore of the tube and prevents lateral movement of the conduit relative to the tube in the active state.

What is claimed is:

1. A conduit and coiled tube system for deployment in a well, comprising:

a coiled tube adapted to be fed downwardly into a well;

a conduit arranged internally of the coiled tube which comprises an internal wall and an internal bore;

a powered device at one end of the coiled tube and which is to be installed in the well and connected to the coiled tube by a first attaching means arranged between the wall of the coiled tubing and the powered device, the conduit being connectable at one end to a power supply at the surface and connected at the opposite end to the powered device; and a dense liquid forming a buoyancy fluid in an annular space between the conduit and the internal wall of the tube and closed at said one end and which provides an upwards buoyancy force to support at least in part the downward weight of the conduit, said conduit being freely arranged over its length in said coiled tube.

2. A conduit and coiled tubing system according to claim 1, that wherein the specific gravity of the fluid is greater than 1 g/cm$^3$.

3. A conduit and coiled tubing system according to claim 2, that wherein the fluid is a concentrated salt solution of calcium chloride.

4. A conduit and coiled tubing system according to claim 1, wherein the fluid is a water based gel.

5. A conduit and coiled tubing system according to claim 1, wherein the fluid is an oil based gel.

6. A conduit and coiled tubing system according to claim 1, wherein the at least one buoyancy means is attached to the conduit.

7. A conduit and coiled tubing system according to claim 6, wherein the at least one buoyancy means is a single buoy extending along a substantial part of the length of the conduit.

8. A conduit and coiled tubing system according to claim 6, wherein the at least one buoyancy means is arranged co-axially around the conduit.

9. A conduit and coiled tubing system according to claim 6, wherein the at least one buoyancy means is activatable between a "neutral" state in which the at least one buoyancy means does not act to support the weight of the conduit and an "active" state in which the at least one buoyancy means is buoyant and acts to support the weight of the conduit.

10. A conduit and coiled tubing system according to claim 6, wherein the at least one buoyancy means is a plurality of buoys arranged in spaced relationship along the length of the conduit.

11. A conduit and coiled tubing system according to claim 6, wherein the at least one buoyancy means is in the form of a flexible bladder which expands to fill at least a part of the concentric space between the conduit and the internal wall of the coiled tubing when said buoyancy means is filled with a relatively lighter fluid, or gas.

12. A conduit and coiled tubing system according to claim 6, wherein the at least one buoyancy means is in the form of a rigid chamber or series of chambers filled with air or another gas.

13. A conduit and coiled tubing system according to claim 6, wherein the at least one buoyancy means is in the form of a rigid cellular foam-like material.

14. A conduit and coiled tubing system according to claim 6, characterised in that the at least one buoyancy means is the form of an expandable foam-like material.

15. A conduit and coiled tubing system according to claim 6, wherein the at least one buoyancy means is in the form of a longitudinal buoy arranged axially on the external wall of the conduit and having a width which corresponds in dimension to a section of the circumference of the conduit.

16. A conduit and coiled tubing system according to claim 9, wherein the at least one buoyancy means is activated by the ingress of air into the at least one buoy.

17. A conduit and coiled tubing system according to claim 6, wherein the at least one buoyancy means engages the internal bore of the tube and prevents lateral movement of the conduit relative to the tube.

18. A conduit and coiled tubing system according to claim 6, wherein the buoyancy means is provided by hollow spherical beads, such as glass beads arranged within the conduit.

19. A conduit and coiled tubing system according to claim 18, wherein the glass beads have a specific gravity of between 0.6 and 1.0, a collapse pressure of between 2000 and 10000 psi and a mesh size between 10 and 80 micrometers.

20. An assembly for deployment in a well which comprises:
   a coiled tube adapted to be fed downwardly into a well and to be supplied on a reel;
   a conduit in said coiled tube and including at least one member selected from the group which consists of a hydraulic line, an electrical conductor and a fiber optic cable;
   a powered device affixed to a lower end of said coiled tube, said conduit being connected to said powered device and being connectable at an upper end of said coiled tube to a power supply for the powered device, said coiled tube being formed with an annular space containing a buoyancy fluid, said annular space being closed at an upper end of said assembly; and
   buoyancy means on said conduit and activatable between a neutral state in which said buoyancy means is ineffective in supporting the weight of the conduit in said fluid and an active state in which the buoyancy means is buoyant and acts to support the weight of the conduit in said fluid.

* * * * *